(12) United States Patent
Karasanti et al.

(10) Patent No.: US 9,604,152 B2
(45) Date of Patent: Mar. 28, 2017

(54) ROTARY ASSEMBLY COMPRISING A FLEXIBLE WIRE

(71) Applicant: BUILDEX (F.E.) LIMITED, Hong Kong (CN)

(72) Inventors: Emiel Dimitri Karasanti, Ningbo (CN); Jakov Yoav Karasanti, Ningbo (CN); Yusheng Li, Taizhou (CN); Edwin Jeroen Muller, TA Delft (NL)

(73) Assignee: Buildex (F.E.) Limited, Hong Kong (HK)

( * ) Notice: Subject to any disclaimer, the term of this patent is extended or adjusted under 35 U.S.C. 154(b) by 0 days.

(21) Appl. No.: 14/763,069

(22) PCT Filed: Jan. 22, 2014

(86) PCT No.: PCT/NL2014/050030
§ 371 (c)(1),
(2) Date: Jul. 23, 2015

(87) PCT Pub. No.: WO2014/116108
PCT Pub. Date: Jul. 31, 2014

(65) Prior Publication Data
US 2015/0352455 A1    Dec. 10, 2015

(30) Foreign Application Priority Data
Jan. 25, 2013 (NL) ..................... 2010187

(51) Int. Cl.
*A63H 17/00* (2006.01)
*A63H 17/26* (2006.01)
*B62K 9/00* (2006.01)

(52) U.S. Cl.
CPC ........... *A63H 17/262* (2013.01); *A63H 17/00* (2013.01); *B62K 9/00* (2013.01)

(58) Field of Classification Search
CPC ...... A63H 17/00; A63H 17/26; A63H 17/262; A63H 17/21
See application file for complete search history.

(56) References Cited

U.S. PATENT DOCUMENTS 1,561,884 A * 11/1925 Pohlson ................. A63H 7/06
446/290
2,121,152 A    6/1938 Knutson
(Continued)

FOREIGN PATENT DOCUMENTS

CN    201286977 Y    8/2009
WO  PCT/NL2014/050030  3/2014

OTHER PUBLICATIONS

"Ringer, Twirler & Twister Rattles by Hape Toys—Sweetbottoms Baby Boutique", Dec. 17, 2012 (www.archive.org), Hape Toys website.

*Primary Examiner* — Gene Kim
*Assistant Examiner* — Alyssa Hylinski
(74) *Attorney, Agent, or Firm* — Alfred M. Walker

(57) ABSTRACT

The invention relates to a rotary assembly (1) comprising two spaced-apart support members (5a, 5b). A shaft (7) is connected with respective ends to each support member (5a, 5b) via an engagement part (12), and a rotary element (4) having a through hole extending around the shaft so as to be supported on said shaft between support members (5a, 5b). The shaft comprises a flexible wire-like elongate body (6) that is connected to the support members (5a, 5b) under axial tension. The shaft is connected to the support members (5a, 5b) in a nonrotating manner, the through hole being of larger diameter than a shaft diameter so that the rotary element (4) is rotatably supported on said shaft (7).

30 Claims, 4 Drawing Sheets

(56) References Cited

U.S. PATENT DOCUMENTS

| | | | | |
|---|---|---|---|---|
| 2,170,257 A | * | 8/1939 | Andersen | B60B 33/00 16/18 CG |
| 2,524,695 A | * | 10/1950 | Daugherty | A63H 17/00 446/275 |
| 2,568,374 A | * | 9/1951 | Thomas | A63H 17/22 446/440 |
| 2,677,216 A | * | 5/1954 | Hein | A63H 29/20 446/462 |
| 3,720,017 A | * | 3/1973 | Ersillo | A63H 17/262 446/466 |
| 3,818,541 A | * | 6/1974 | Daniels | B60B 33/00 16/18 A |
| 4,210,135 A | | 7/1980 | Deuser | |
| 5,568,671 A | * | 10/1996 | Harris | B60B 33/0002 16/18 R |
| 6,016,900 A | * | 1/2000 | Longrod | B65G 39/12 193/35 F |
| 6,425,797 B1 | * | 7/2002 | Wu | A63C 17/22 16/30 |
| 2003/0077974 A1 | | 4/2003 | Wang | |

* cited by examiner

ROTARY ASSEMBLY COMPRISING A FLEXIBLE WIRE

FIELD OF THE INVENTION

The present invention relates to a rotary assembly comprising two spaced-apart support members, a shaft connected with respective ends to each support member via an engagement part, and a rotary element having a through hole extending around the shaft so as to be supported on said shaft between support members, the shaft comprising a flexible wire-like elongate body that is connected to the support members under axial tension. The invention relates in particular to vehicles and, more particularly, to a rotary assembly for a vehicle wherein a rotary element is being releasably secured to support elements a flexible wire-like elongated body within a slit of the support element, so that the flexible wire-like elongated body has a dual function for the rotary element.

DESCRIPTION

Rotary assemblies which utilize flexible wires such as elastic bands or rubber bands for the propulsion of toys or infant vehicles that have to be inexpensively produced, are known for numerous years now. Examples of such a configurations include miniature toy vehicles using elastic bands where the band is held against rotation at several fixed anchoring points so that the toy can be propelled by the unwinding of the elastic band driving the wheels.

A toy of this type is disclosed in U.S. Pat. No. 3,221,446 showing a frame comprising a wheel-axle structure including a rubber band and a pair of wheels. The wheels have an axial opening through which the rubber band is axially routed and secured. The rubber band is fastened to the frame at its sides, so when the wheels are rotated, the rubber band is twisted, bringing them under sufficient tension to provide backward rotation on the wheels upon unwinding to propel the toy.

One of the disadvantages of the known structure is that the wheels cannot freely rotate, and that its range of travel will be limited by the strength and length of the rubber band. Moreover, mounting and replacement of the rubber band of the known structure is relatively difficult and laborious because tools would be needed in order to install or replace the rubber band. Installation of the known wheel assembly will be carried out by the manufacturer before the toy is shipped to the user in the assembled state so that the assembled toy takes up a relatively large space in the package. In addition, the material of the known drive mechanism including an elastic band may not be suitable for other applications than driving a toy vehicle in terms of the required rigidity, mechanical strength or its suitability to function in varying conditions, such as in weather conditions that may affect the elastic properties of the rubber band.

A further propelled toy is disclosed in U.S. Pat. No. 3,720,016 wherein a power unit is used for operating a toy vehicle, comprising a housing body comprising bearings for receiving traction wheels. The wheels are connected together via an axle. A rubber band is inserted in the axle and is securely attached to the sidewalls of the housing. The axle has at its central part, a narrow portion that serves to anchor the central portion of the rubber band, so the rubber band cannot rotate at said anchoring point. The rubber band may be twisted between the anchoring point to provide the motor power when the rubber is twisted or untwisted.

This know structure is relatively complex and requires several interconnected parts in order to achieve the same result as the previous know structure which are relatively difficult to assemble and which make replacement of the rubber band difficult. Furthermore, the user cannot freely rotate the wheels as range of the rotation of the wheels is limited by the rubber elasticity which provides with the propeller force for rotating the toy vehicle when the wheels become in frictional contact with a surface.

It is clear that with the above-mentioned prior art solutions provide a propulsion using a pre-assembled elastic drive member acting on the wheels, that is relatively complex. Accordingly, it may take quite an effort to mount and replace parts and also to arrange the wheels at the right position. Furthermore, the known elastic drive member may for certain applications outside the area of miniature cars, not form a suitable construction.

Accordingly it would be desirable to overcome or mitigate at least one of the disadvantages of the prior art. It is an object of this invention to provide a rotary assembly that provides an easy and accurate assembly and/or replacement of the rotary element. It is a further aim to provide a rotary assembly that is not limited in its driving range by the elastic properties of the flexible axle supporting the rotary element and that can be applied in a large variety of applications, ranging from toy vehicles such as cars, or trains to infant bikes or carts to drive assemblies for vehicles, gears, clocks and the like. It is again an object of the present invention to provide a rotary assembly that can be shipped to the user in a compact form in the disassembled state and that can be assembled by a non-trained user, preferably without the use of any tools. It is moreover an object of the invention to provide a rotary assembly in which the shaft forms a resilient but at the same time a sufficiently rigid suspension for the rotary element, which is stiff, enough to provide the required accuracy for accurately defined rotation.

SUMMARY OF THE INVENTION

The object is achieved by the rotary assembly according to the invention in which the shaft is connected to the support members in a non-rotating manner, the through hole being of larger diameter than a shaft diameter so that the rotary element is rotatably supported on said shaft.

Advantageously, according to the invention the non-rotating connection of the shaft to the support members provides a very simple and inexpensive axle that can be easily assembled and disassembled by a non-trained user. The tension of the flexible wire-like elongate body can be easily adjusted so that sufficient stiffness is provided for accurate and well-defined rotation of the rotary element that can freely rotate around the shaft, while at the same time providing the required resiliency to the shaft, to take up any play allowing well-defined motion of the rotary element, or to function as a shock-absorber. In this manner, the rotary element according to the invention can be shipped to the user in a very compact disassembled package in the form of a construction kit, to be assembled by the user at the desired location of use. Attaching of the shaft carrying the rotary element, which may for instance comprise a wheel, a drive pulley or a gear or a non circular object, can be carried out by hand, preferably without the use of complex or specific tools, by elongating and tensioning the shaft between the support members.

Furthermore, the rotary assembly according to the present invention can be utilized in a large variety of applications since the non-rotating resilient shaft does not drive the rotary element and its flexible properties can be designed for easy attachment to the support members and for providing sufficient resiliency and stiffness to function as a rigid but flexible suspension. It can be envisaged that the wire-like elongate body forming the shaft can be of any desired flexible material, such as metal or plastic wire, elastomeric or rubber wire, threads or filaments or any combinations thereof. By use of a plastic wire for instance, as a shaft, the rotary assembly of the invention can be used in an outdoor environment exposed to moisture and/or heat and by use of a metal reinforced wire for instance, the shaft can be used for more heavy duty applications supporting larger loads, such as in carts or bicycles to be used by kids or adults. Using a relatively rigid metal wire that is placed under higher tension between the support members can function as a shaft for use in rotary constructions such as gears, clocks and the like in which different rotary parts can be interconnected to rotate in an accurately defined position.

The rotary element according to the invention may be of any shape, with an elliptical, polygonal, triangular, or square cross-sectional shape, but preferably has a circular cross-section to function as a wheel, drive pulley or gear. The rotary element may be formed of any material such as wood, stone, plastic or metal. The circumferential surface may be provided with a track or tyre of resilient material, with a groove for guiding a belt or wire in pulley construction or with gears.

The through hole may be of a diameter that substantially corresponds to the diameter of the wire-like shaft but that is slightly larger so as to allow free rotation of the rotary element around the stationary shaft. Alternatively, the through-hole through the rotary element may be relatively large, a connector being placed on the flexible shaft to be inserted and fixed in the through hole. The connector may be fixed on the shaft in a non-rotating manner, the rotational element being able to rotate around the connector via a slide bearing or roller bearing construction. Alternatively, the connector is rotatingly connected to the shaft, the rotational element being engaged fixedly in a non-rotating manner to the connector.

The wire-like body is elastic and in its intentioned state is of shorter length than an axial distance between the support members.

When disconnected from the support member, the elastic wire-like body is of shorten length than the distance between the opposing support members. By stretching of the elastic wire-like body, the shaft is elongated so that it can bridge the distance between the support members and can be attached to the support members.

It should be noted that the elastic and shorter length of the wire-like body of the shaft allow tightening of the assembly and an easy connection and disconnection of the shaft with the support members at a predefined tension, with as a consequence that the rotary element can be positioned at a proper distance from each support member.

In a preferred embodiment of the invention, at each end of the flexible wire-like body a broadened engagement part is provided, which releasably engages with complementary engagement part on the support members while the flexible wire-like body is placed under axial tension by being elongated by between 1% and 100%, preferably between 5% and 50%.

This provides a flexible and dynamic rotary assembly that can be used in different constructions providing effective adjustment of the shaft with respect to the support members. By extending the flexible wire-like body under axial tension, the rotatable element is provided with a properly adjusted suspension, while is kept in place and in fully rotatable position. The broadened end parts on the shaft furthermore function to maintain the rotary element on the shaft when it is not engaged with the support members, so that the shaft and the rotary element form a constructional unit which can as such be packaged and shipped, and be taken from the package upon installation by the user.

For example, the engagement part may comprise a knot in the end of the wire-like elongate body.

This provides for a very simple, inexpensive and effective manner of securing the shaft to the support members.

In a further embodiment, the engagement part comprises a bead on the end of each wire-like elongate body.

Advantageously, by having a bead at the end of each wire-like elongate body a mechanically defined manner for securing the ends of the wire-like body to the support members is provided, wherein the surface of contact of the engagement part is increased. Furthermore, the bead-shaped engagement part provides a stronger connection of the ends of the wire-like body with the support members.

The engagement part of the axial wire-like body may comprise a screw thread, and at least one matching bolt, complementary engagement means on the support members comprising a hole of a diameter that is larger than a diameter of the wire-like elongate body and smaller than a diameter of the at least one bolt.

This configuration provides a more secured fixing assembly and an easy to adjust tension of the shaft that provides the desired length of the wire-like body while also providing an effective resiliency of the suspension of the rotary element.

The support members may comprise a peripheral edge, a slit extending from the edge to an end portion, the orientation of the slit being transverse to the axial direction.

Advantageously, by having and slit with the afore mentioned configuration, the elongate body can be easily placed in the slit by a user, which is especially advantageous when the rotary assembly forms part of a construction kit that is to be assembled by the user without any special tools. It also provides a uniform, reproducible and foolproof mode for securing the wire-like body to the support members.

Preferably, the slit near the end portion is of substantial the same width as the flexible wire-like elongate body. so that the wire-like body is accurately and firmly supported in the slit and the rotary element is properly positioned without the need for complex constructions for retaining the wire like body.

According to another embodiment of the present invention, the support members form a substantially closed contour around the rotary element, defining an upper plane for contacting the engagement parts and a lower plane, the slits extending from the upper to the lower plane, transversely to the planes.

The closed contour of the support member can provide a constructional unit that can be mounted onto a structure, such as to the frame of a vehicle, to a rear wheel suspension or to a steering column. Furthermore, the contour around the rotary element provides a mechanical protection preventing undesired impact or other contacts with bodies that might disrupt the rotary motion.

BRIEF DESCRIPTION OF THE DRAWINGS

Other aspects, features and details of the present invention can be more completely understood by reference to the following detailed description of a number of embodiments, taken in conjunction with the drawings and from the appended claims. In the drawings:

DETAILED DESCRIPTION

Figure 1:
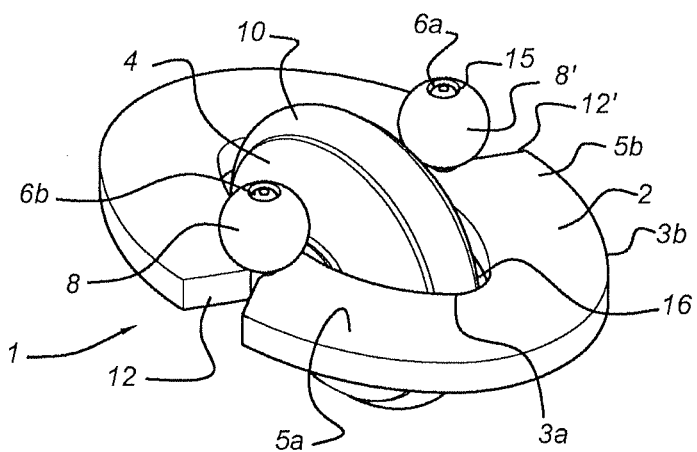
FIG. 1 illustrates a perspective view of a rotary assembly according to a first embodiment of the invention.

Referring first to FIG. 1, the rotary assembly 1 in its assembled state is illustrated including a frame 2 with an inner edge 3a in the form to a substantially closed contour 16 defining an opening, and with an outer edge 3b. Opposite sides on the frame 2 provides two spaced-apart support members' 5a, 5b being arranged in a symmetrical configuration on the frame 2. The outer edges 3b of the support members' 5a, 5b comprise receiving parts in a form of a V-shaped indentation or notch 12, 12'. The notches 12,12' are generally arranged symmetrically with respect to a longitudinal centerline of the contour 16.

Equivalently, the notches 12,12' forming the receiving parts, could be selected from, but are not limited to notches, openings, recesses, holes, etc.

As it can be appreciated, a rotary element is provided in a form of a wheel 4. The wheel 4 is situated within the opening defined by contour 16, and it is rotatably supported on a stationary shaft 6 (see FIG. 2) made of a flexible and resilient elongate body i.e. an elastic wire 6, that is releasably connected to the support members 5a, 5b. The elastic wire 6 is releasably secured to each of the support members' 5a, 5b by inserting its first and second ends 6a, 6b into the notches 12. The first and second ends 6a, 6b of the elastic wire 6 comprise engagement parts in the form of respective beads 8,8' as here illustrated. The beads 8,8' each have an axial opening 15 extending along its entire length/height in which the ends 6a, 6b of the elastic wire 6 are securely retained. The beads 8,8' have a diameter of about 2 to 10 times the diameter of the elastic wire 6 in order to prevent the elastic wire 6 from being released from the notches 12,12'. The wheel 4 can freely rotate in any direction along its own plane of symmetry, while the elastic wire 6 remains static and acts as a resilient axle and suspension providing adjustable (via the tension in the wire 6) shock absorption when in use.

The beads 8, 8' can have configurations that can be chosen but not limited to beads, knobs, buckles, clips or the like or can be formed of the same material as the wire 6, for instance by a broadened end part or a knot.

The notches 12, 12' are designed in such a way to guide the wire 6 when the user pulls the beads 8,8' apart to provide an increased force for inserting the ends 6a, 6b of the elastic wire 6 into the notches 12,12' When the ends 6a, 6b of the elastic wire 6 are inserted in the notches 12, 12' and released, they are securely retained within the notches 12. Moreover, the beads 8,8' are seated against the upper surface of the support members 5a, 5b and are retained by the tensional force exerted by the elastic wire 6. The elastic wire 6 is kept in a steady position, while remaining under tension to provide a flexible connection with a resilient suspension of the wheel 4, while smoothness rotation of the wheel 4 is provided. The through hole 16 (see FIG. 3) through the center of the wheel 4 is sufficiently narrow but slightly larger than the diameter of the wire 6 to allow free rotation of the wheel without wobbling.

Figure 2:
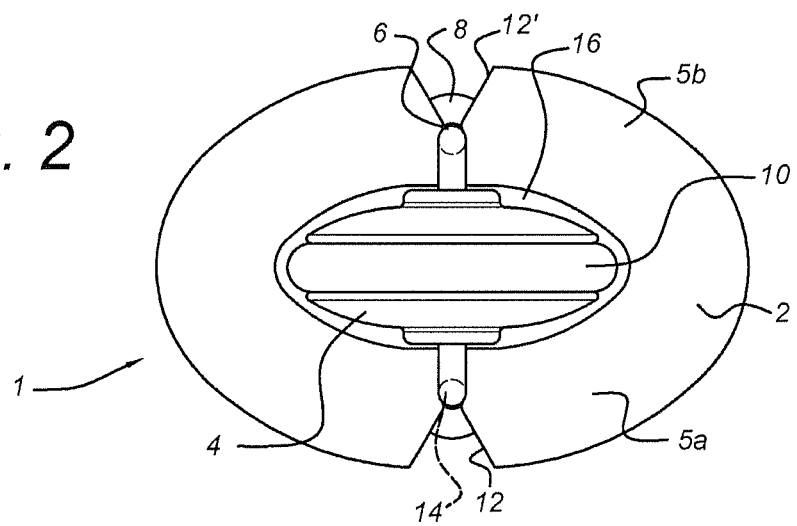
FIG. 2 is a plan bottom view of the rotary assembly of FIG. 1.

As becomes clear from FIG. 2, the notches 12, 12' further comprise a peripheral edge and a slit 14 forming an end portion of the notches 12,12' with a diameter that substantially corresponds with the diameter of the wire 6, so that the elastic wire 6 can be securely inserted into the slit 14. The edges of the slit 14 could be slightly smaller than the diameter of the elastic wire 6 to retain the elastic wire 6. The wheel 4 further comprises a ring-shaped resilient covering 10 fitting around its outer most edge in a form of a rubber rim 10. The rubber rim 10 protects the wheel 4 and enables better performance while rotation, and further providing flexible cushion that absorbs shock.

Figure 3:
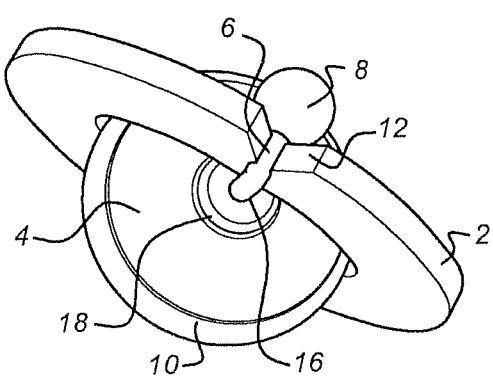
FIG. 3 is a perspective view of the bottom part of the rotary assembly of FIG. 1.

FIG. 3 shows a perspective view of the bottom part of the rotary assembly in assembled state according to the first embodiment of the invention. As it can be seen, the beads 8 are seated against the top part of the support members 5a, 5b. The wheel 4 further comprises an axle 18 defining the through hole 16 of the wheel 4. The axle 18 may be attached to the wheel 4 via bearings and may be connected to the wire 6 in a non-rotating manner.

The elastic wire 6 may be formed by an elastic material that is being elongated in such a way that its effective length has been increased between 1-100%. It should be noted that the effective length of the elastic wire 6, can be elongated between 5-50% in order to provide with an optimum suspension for the wheel 4.

Figure 4:
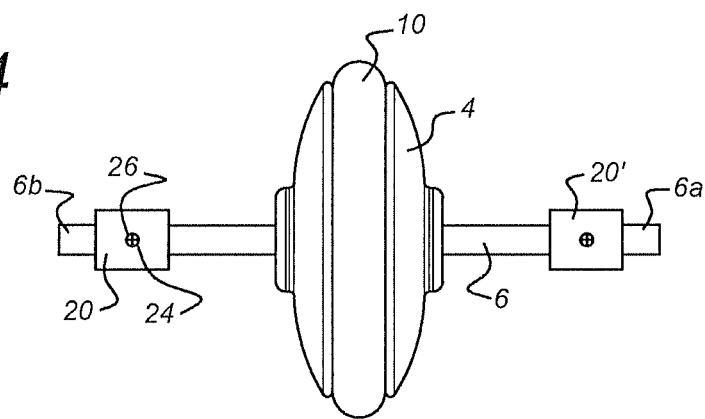
FIG. 4 is a frontal view of a second embodiment of a rotary assembly according to the invention.

FIG. 4 illustrates the wheel 4 and the elastic wire 6 in assembled state according to an embodiment of the invention. As it can be appreciated, one end of the elastic wire 6 has been inserted into the through hole 16 of the wheel 4, for placing the respective ends 6a, 6b of the elastic wire 6 on each side of the wheel 4, creating a wheel-axle sub-assembly. The engagement means 20, 20' as here illustrated are in the form of a buckle, also known as a shaft collar, to clampingly engage with the wire 6, having a screw thread 24 and a bolt 26 screwed within the screw thread 24. The elastic wire 6 is axially routed through a hole of the buckle 20, 20' and securely positioned at a certain distance from the ends 6a, 6b of the elastic wire 6. By screwing the bolt 26 into the screw thread 24, until the bolt 26 compresses the elastic wire 6 against internal wall of the axial opening of the buckle 20, the latter is secured on the wire 6. By unscrewing the bolt 26, the buckle 20,20' becomes lose and it can be repositioned at any point between the end of the elastic wire 6 and the wheel 4.

Furthermore, the screw thread 24 could also be positioned at one axial edge of the buckle 20, while the bolt 26 is screwed within the screw thread 24 into the end face of the wire 6. In this manner, the elastic wire 6 ends are secured within the buckle 20 by the screw tread 24.

Figure 5:
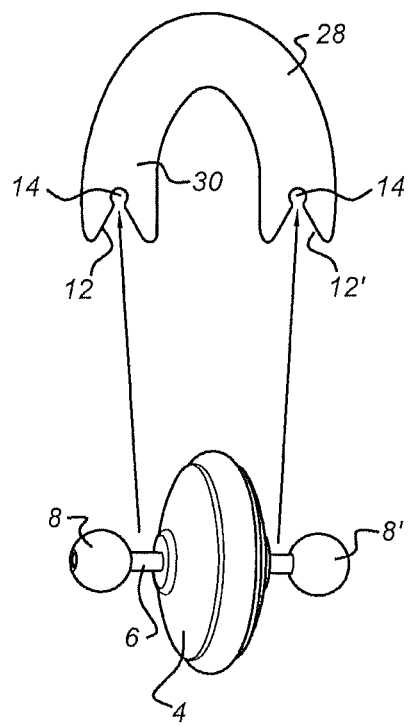
FIG. 5 is a frontal view of a third embodiment of a rotary assembly according to the invention, that is in particular suitable to form a fore fork suspension for a bicycle or toy motor cycle.
Figure 6:
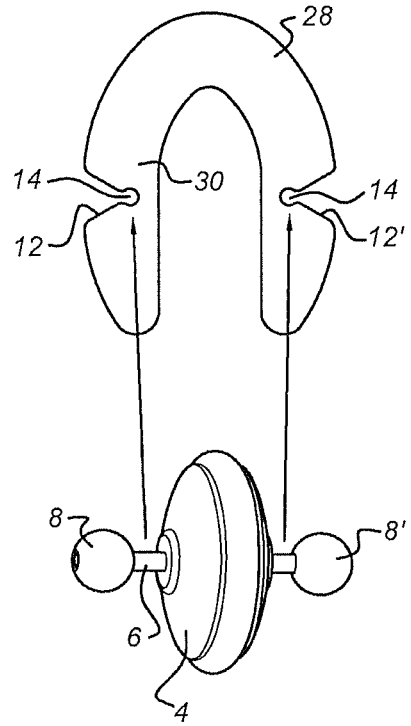
FIG. 6 is a frontal view of a forth embodiment which forms an alternative fore fork suspension for a bicycle or toy motor cycle.

In FIG. 5 a view of the front part of the rotary assembly in assembled state according to a further embodiment of the invention is shown. The support member 28 comprises a curved space 30 in the form of an arch, around the wheel 4. The support member 28 is located in a plane substantially transversal to the plane of the wheel 4. Furthermore, the support member 28 comprises at each side of the space 30, the notches 12, 12' having axial holes with a diameter slightly bigger than the diameter of the elastic wire. In FIG. 6 an alternative rotary assembly of similar type as FIG. 5 is shown, being particularly suitable as a fore fork for a bicycle or motor cycle.

Figure 7:
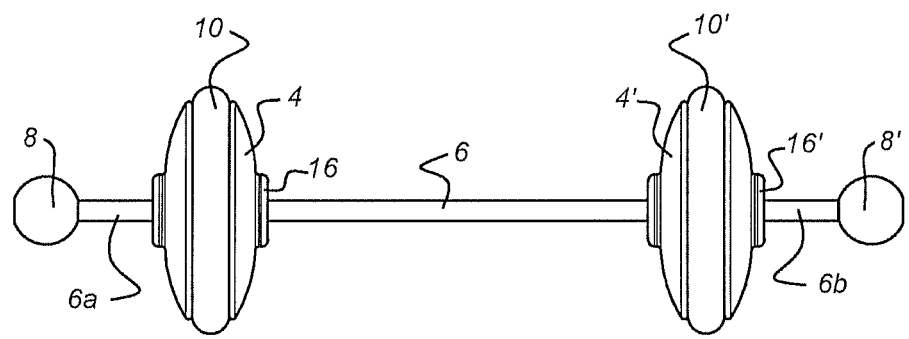
FIG. 7 is a frontal view of a further embodiment having at least two rotary elements supported on an elastic wire according to a further embodiment of the invention.

FIG. 7 shows a front view of the elastic wire 6 and pair of wheels 4, 4' having tracks 10, 10' in the assembled state according to a further embodiment of the invention. As illustrated, the wheels 4, 4' are situated at a distance from each other, the elastic wire 6 extending through their central holes 16, 16'. At each end of the elastic wire 6 a bead 8, 8' is provided for holding the wheels 4, 4' between the ends 6a, 6b of the elastic wire 6. Instead of two wheels 4,4' a larger number of wheels can be supported on the elastic wire 6.

Figure 8:
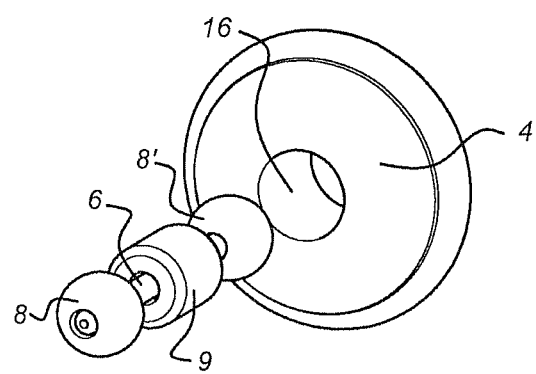
FIG. 8 shows an embodiment wherein the engagement parts can be placed through the central through hole, a connector being placed on the flexible shaft.

FIG. 8 shows an embodiment wherein a connector 9 is placed on the elastic wire 6. The through hole 16 in the wheel 4 is of a relatively large diameter so that the beads 8,8' on the end of the wire 6 can pass through the hole 16. The connector 9 can be locked into place inside the hole 16, for instance by friction. The connector 9 can freely rotate around the wire 6. In case the connector is connected to the wire 6 in a non-rotating manner, the engagement of the connector 9 with the hole 16 should allow rotation of the wheel 4 around the connector 9 in this case.

Figure 9:
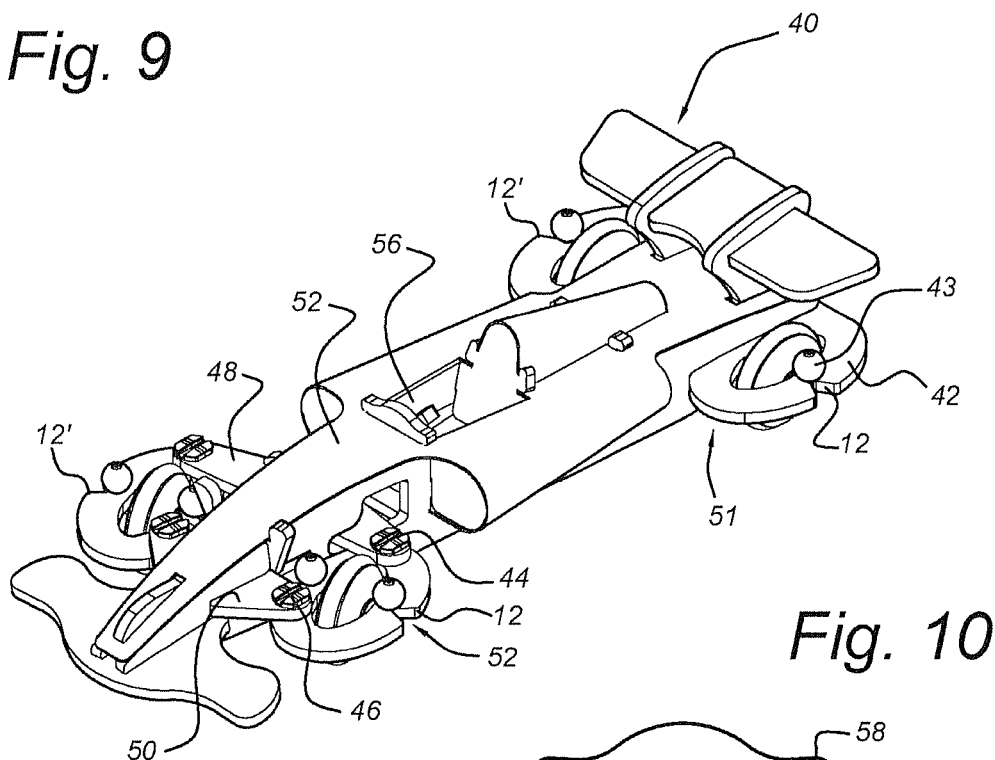
FIG. 9 illustrates a perspective view of a toy vehicle embodying the rotary assemblies of the invention.
Figure 10:
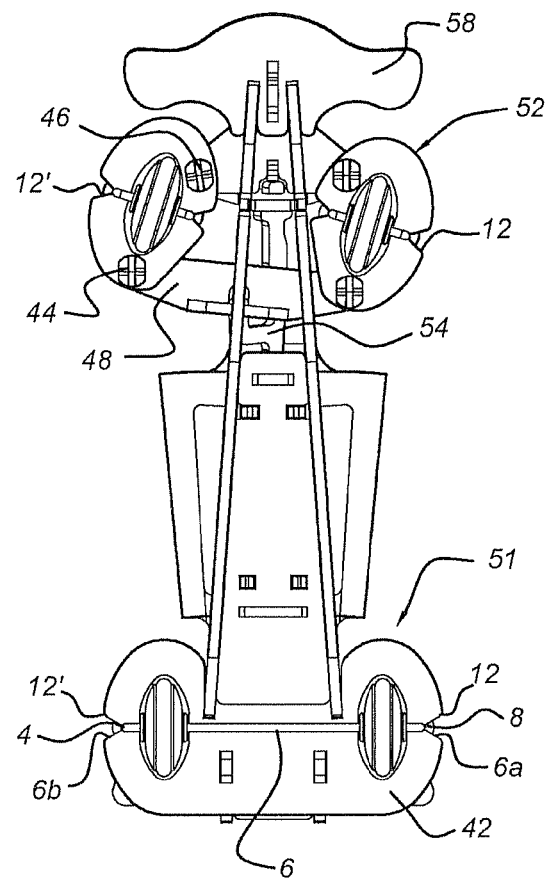
FIG. 10 illustrates a plan view of the bottom part of the toy vehicle of FIG. 9.

FIGS. 9 and 10 show different views of a toy vehicle embodying the rotary assembly of the invention. As it can be appreciated, the toy vehicle 40 incorporates two rotary assemblies 52 according to the invention in its front part, while at the rear part it can be seen that the rotary assembly 52 is fixedly mounted. The support member 42 of rear assembly 51 comprises a substantially closed contour around openings in which the wheels 4 are located. The elastic wire ends 6a, 6b are securely inserted into the notches 12, 12'.

The front rotary assemblies 52 are hingedly connected by hinge parts 48, 50 of the steering mechanism at two different hinge points 44, 46 hinge parts 48, 50 is pivotably connected to the main body 52 of the toy vehicle 40 via a steering element 56. The hinge points 44, 46 are situated in the support members 5a, 5b at a different distance. Moreover, the hinge part 48 is connected with a pivot element 54, which is driven by the steering element 56. The steering element 56 can be moved, providing rotation of the hinge part 48. The hinge part 50 is pivotally connected to a front part 58 of the toy vehicle 40, providing stability to the rotary assemblies 52.

Optionally, the present invention includes a toy vehicle having a rotary wheel supporting assembly (1) including:

a) two spaced-apart support members (5a, 5b), a shaft (6) connected with respective ends to each support member (5a, 5b) via an engagement part (12);

b) a rotary wheel (4) having a through hole extending around the shaft so as to be supported on said shaft between support members (5a, 5b);

c) the shaft (6) comprising a flexible wire-like elongate body (6) that is connected to the support members (5a, 5b) under axial tension;

d) wherein the shaft is connected to the support members (5a, 5b) in a non-rotating manner, the through hole being of larger diameter than a shaft diameter so that the rotary wheel (4) is rotatably supported on said shaft (6);

e) wherein said wire-like body being elastic (6) and of shorter length than an axial distance between the support members (5a, 5b) when disconnected from the support members (5a, 5b), f) wherein at each end (6a, 6b) of the flexible wire-like body (6) a broadened engagement part (8) is provided, which releasably engages with complementary engagement part (12) on the support members (5a, 5b) while the flexible wire-like body (6) is placed under axial tension by being elongated by between 1% and 100%, preferably between 5% and 50%, and, g) wherein the engagement part (5a, 5b) comprises a bead (8) in the end (6a, 6b) of the wire-like elongate body (6).

The engagement part (8, 20) of the axial wire-like body of the aforementioned toy vehicle preferably comprises a screw thread (24), and at last one matching bolt (26), and the complementary engagement means on the support members (5a, 5b) comprises a hole (32) of a diameter that is larger than a diameter of the wire-like elongate body (6) and smaller than a diameter of the at least one bolt (26). The support members (5a, 5b) comprise a peripheral edge, and a slit (14) extending from the edge to an end portion, where optionally the orientation of the slit (14) is transverse to the axial direction and the slit (14) near the end portion is of substantial the same width as the wire-like body.

The support members (5a, 5b) optionally form a substantially closed contour (16) around the rotary element (4), defining an upper plane for contacting the engagement parts (12) and a lower plane, with the slits (14) extending from the upper to the lower plane, transversely to the planes.

The spaced-apart members of the toy vehicle are at opposite ends of a member surrounding the rotary wheel, and the spaced-apart members include notches in the surrounding member, and the wire-like body has the beaded ends engaging the notches to establish and maintain the tension associated therewith. Preferably the notches are provided on the outer periphery surface of said surrounding member, and/or are provided on respective extremities of said surrounding member.

It should also be understood that a skilled person will recognize that the rotary assembly here illustrated could also be used in a different vehicle than the one illustrated.

It is thus believed that the operation and construction of the present invention will be apparent from the foregoing description. The term comprising when used in this description or the appended claims should not be construed in an exclusive or exhaustive sense but rather in an inclusive sense. Features which are not specifically or explicitly described or claimed may be additionally included in the structure according to the present invention without deviating from its scope. The invention is further not limited to any embodiment herein described and, within the purview of the skilled person, modifications are possible which should be considered within the scope of the appended claims.

The invention claimed is:

1. Rotary wheel supporting assembly for a toy vehicle comprising:

two spaced-apart support members, a shaft connected with respective ends to each support member via an engagement part thereof, and a rotary wheel having a through hole extending around the shaft so as to be supported on said shaft between said support members, the shaft comprising a flexible wire that is connected to the support members under axial tension;

wherein said shaft is connected to the support members in a non-rotating manner, the through hole being of larger diameter than a shaft diameter so that the rotary wheel is rotatably supported on said shaft;

wherein said wire being elastic and of shorter length than an axial distance between the support members when disconnected from the support members; and wherein said rotary wheel assembly supports said toy vehicle during movement thereof.

2. The assembly for a toy vehicle according to claim 1, wherein at each end of the wire a broadened engagement part is provided, which releasably engages with a respective complementary engagement part on the support members while the flexible wire is placed under axial tension by being elongated by between 1% and 100%.

3. The assembly for a toy vehicle according to claim 2, wherein the engagement part comprises a knot in each end of the wire.

4. The assembly for a toy vehicle according to claim 2 wherein the engagement part comprises a bead in each end of the wire.

5. The assembly for a toy vehicle according to claim 1 wherein the engagement part of the wire comprises a screw thread, and at least one matching bolt, complementary engagement means on the support members comprising a hole of a diameter that is larger than a diameter of the wire and smaller than a diameter of the at least one bolt.

6. The assembly for a toy vehicle according to claim 1, the support members comprising a peripheral edge, and a slit extending from the edge to an end portion of notches formed in outer edges of said support members for guiding said wire.

7. The assembly for a toy vehicle according to claim 6, the slit near the end portion being of substantially the same width as the wire.

8. The assembly for a toy vehicle according to claim 7, the support members forming a substantially closed contour around the rotary element, defining an upper plane for contacting the engagement parts and a lower plane, the slit extending from the upper to the lower plane, transversely to the planes.

9. The assembly for a toy vehicle according to claim 3 wherein the engagement part comprises a bead in each end of the wire.

10. The assembly for a toy vehicle according to claim 2 wherein the engagement part of the wire comprises a screw thread, and at least one matching bolt, complementary engagement means on the support members comprising a hole of a diameter that is larger than a diameter of the wire and smaller than a diameter of the at least one bolt.

11. The assembly for a toy vehicle according to claim 3 wherein the engagement part of the wire comprises a screw thread, and at least one matching bolt, complementary engagement means on the support members comprising a hole of a diameter that is larger than a diameter of the wire and smaller than a diameter of the at least one bolt.

12. The assembly for a toy vehicle according to claim 4 wherein the engagement part of the wire comprises a screw thread and at least one matching bolt, complementary engagement means on the support members comprising a hole of a diameter that is larger than a diameter of the wire and smaller than a diameter of the at least one bolt.

13. The assembly for a toy vehicle according to claim 1, the support members comprising a peripheral edge, and a slit extending from the edge to an end portion of notches formed in outer edges of said support members for guiding said wire.

14. The assembly for a toy vehicle according to claim 2, the support members comprising a peripheral edge, and a slit extending from the edge to an end portion of notches formed in outer edges of said support members for guiding said wire.

15. The assembly for a toy vehicle according to claim 3, the support members comprising a peripheral edge, and a slit extending from the edge to an end portion of notches formed in outer edges of said support members for guiding said wire.

16. The assembly for a toy vehicle according to claim 4, the support members comprising a peripheral edge, and a slit extending from the edge to an end portion of notches formed in outer edges of said support members for guiding said wire.

17. The assembly for a toy vehicle according to claim 5, the support members comprising a peripheral edge, and a slit extending from the edge to an end portion of notches formed in outer edges of said support members for guiding said wire.

18. The assembly for a toy vehicle according to claim 6, the slit near the end portion of notches formed in outer edges of said support members for guiding said wire being of substantially the same width as the wire.

19. The assembly for a toy vehicle according to claim 6, the support members forming a substantially closed contour around the rotary element, defining an upper plane for contacting the engagement parts and a lower plane, the slit extending from the upper to the lower plane, transversely to the planes.

20. The assembly for a toy vehicle according to claim 6, the support members forming a substantially closed contour around the rotary element, defining an a upper plane for contacting the engagement parts and a lower plane, the slit extending from the upper to the lower plane, transversely to the planes.

21. A toy vehicle having a rotary wheel supporting assembly comprising:
two spaced-apart support members, a shaft connected with respective ends to each support member via an engagement part;
a rotary wheel having a through hole extending around the shaft so as to be supported on said shaft between support members;
the shaft comprising a flexible wire that is connected to the support members under axial tension;
wherein the shaft is connected to the support members in a non-rotating manner, the through hole being of larger diameter than a shaft diameter so that the rotary wheel is rotatably supported on said shaft;
wherein said wire being elastic and of shorter length than an axial distance between the support members when disconnected from the support members;
wherein at each end of the wire a broadened engagement part is provided, which releasably engages with a complementary engagement part on the support members while the wire is placed under axial tension by being elongated by between 1% and 100%, and,
wherein the engagement part comprises a bead in each end of the wire.

22. The toy vehicle according to claim 21 wherein the engagement part of the wire comprise a screw thread, and at least one matching bolt, complementary engagement means on the support members comprising a hole of a diameter that is larger than a diameter of the wire-like elongate body and smaller than a diameter of the at least one bolt.

23. The toy vehicle according to claim 21, the support members comprising a peripheral edge, and a slit extending from the edge to an end portion of notches formed in outer edges of said support members for guiding said wire.

24. The toy vehicle according to claim 23, the slit near the end portion being of substantial the same width as the wire.

25. The toy vehicle according to claim 23, the support members forming a substantially closed contour around the rotary element, defining an upper plane for contacting the engagement parts and a lower plane, the slit extending from the upper to the lower plane, transversely to the planes.

26. The toy vehicle according to claim 21 in which said spaced-apart members are at opposite ends of a member surrounding said rotary wheel, said spaced-apart members consist of notches in said surrounding member, said wire having the beaded ends engaging said notches to establish and maintain said tension.

27. The toy vehicle according to claim 26 in which said notches are provided on the outer periphery surface of said surrounding member.

28. The toy vehicle according to claim 26 in which said notches are provided on respective extremities of said surrounding member.

29. The assembly for a toy vehicle as in claim 2 wherein said wire is placed under axial tension by being elongated by between 5% and 50%.

30. The toy vehicle as in claim 21 wherein said wire is placed under axial tension by being elongated by between 5% and 50%.

* * * * *